United States Patent
Esseghir et al.

(10) Patent No.: US 10,287,473 B2
(45) Date of Patent: *May 14, 2019

(54) POLYMER COMPOSITE COMPONENTS FOR WIRELESS-COMMUNICATION TOWERS

(71) Applicant: Dow Global Technologies LLC, Midland, MI (US)

(72) Inventors: Mohamed Esseghir, Collegeville, PA (US); Bret P. Neese, North Wales, PA (US); William J. Harris, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 635 days.

This patent is subject to a terminal disclaimer.

(21) Appl. No.: 14/437,003

(22) PCT Filed: Nov. 13, 2013

(86) PCT No.: PCT/US2013/069824
§ 371 (c)(1),
(2) Date: Apr. 20, 2015

(87) PCT Pub. No.: WO2014/099187
PCT Pub. Date: Jun. 26, 2014

(65) Prior Publication Data
US 2015/0284618 A1 Oct. 8, 2015

Related U.S. Application Data

(60) Provisional application No. 61/739,839, filed on Dec. 20, 2012.

(51) Int. Cl.
*H04B 1/10* (2006.01)
*H01P 7/00* (2006.01)
(Continued)

(52) U.S. Cl.
CPC ............... *C09K 5/14* (2013.01); *C08K 3/36* (2013.01); *C08K 7/06* (2013.01); *C08K 7/24* (2013.01);
(Continued)

(58) Field of Classification Search
CPC ..................................................... H01P 11/007
See application file for complete search history.

(56) References Cited

U.S. PATENT DOCUMENTS 4,250,064 A * 2/1981 Chandler ............... C08K 13/04
524/35
4,632,798 A * 12/1986 Eickman ............... C08G 63/605
257/788

(Continued)

FOREIGN PATENT DOCUMENTS

| EP | 1544938 A1 | 6/2005 |
| JP | 2009-108425 A | 5/2009 |
| WO | 1997/042639 A1 | 11/1997 |

OTHER PUBLICATIONS

"ULTEM Resin," obtained May 18, 2017, Saudi Basic Industries Corporation (SABIC), https://www.sabic-ip.com/gep/Plastics/en/ProductsAndServices/ProductLine/ultem.html.*
(Continued)

*Primary Examiner* — Vivian Chen (57) ABSTRACT

A wireless-communications-tower component being at least partially formed from a polymer composite. The polymer composite comprises a thermoplastic polymer and a filler, where the thermoplastic polymer is non-foamed. The polymer composite has a thermal conductivity of at least 0.5 watt per meter Kelvin ("W/m?K") measured at 25 C. Such wireless-communications-tower components include radio frequency ("RF") cavity filters, heat sinks, enclosures, and combinations thereof.

4 Claims, 2 Drawing Sheets

(51) Int. Cl.
| | |
|---|---|
| *H01P 7/06* | (2006.01) |
| *C08L 69/00* | (2006.01) |
| *C08L 81/00* | (2006.01) |
| *C08L 81/06* | (2006.01) |
| *C08K 3/013* | (2018.01) |
| *C08K 3/04* | (2006.01) |
| *C08K 3/08* | (2006.01) |
| *C08K 3/36* | (2006.01) |
| *C08K 3/38* | (2006.01) |
| *B32B 15/08* | (2006.01) |
| *B32B 27/18* | (2006.01) |
| *B32B 27/20* | (2006.01) |
| *B32B 27/28* | (2006.01) |
| *B32B 27/36* | (2006.01) |
| *C09K 5/14* | (2006.01) |
| *C08L 101/00* | (2006.01) |
| *C08K 7/06* | (2006.01) |
| *C08K 7/24* | (2006.01) |

(52) U.S. Cl.
CPC ............. *C08L 69/00* (2013.01); *C08L 81/06* (2013.01); *C08L 101/00* (2013.01); *B32B 15/08* (2013.01); *B32B 27/18* (2013.01); *B32B 27/20* (2013.01); *B32B 27/286* (2013.01); *B32B 27/365* (2013.01); *B32B 2255/205* (2013.01); *B32B 2307/30* (2013.01); *B32B 2307/302* (2013.01); *B32B 2307/72* (2013.01); *B32B 2307/734* (2013.01); *B32B 2311/08* (2013.01); *B32B 2311/12* (2013.01); *B32B 2369/00* (2013.01); *B32B 2457/00* (2013.01); *C08K 3/013* (2018.01); *C08K 3/04* (2013.01); *C08K 3/08* (2013.01); *C08K 3/38* (2013.01); *C08K 2003/0812* (2013.01); *C08L 81/00* (2013.01); *C08L 2203/20* (2013.01); *H01P 7/00* (2013.01); *H01P 7/06* (2013.01); *H04B 1/10* (2013.01); *Y10T 428/1314* (2015.01); *Y10T 428/249974* (2015.04); *Y10T 428/31507* (2015.04); *Y10T 428/31678* (2015.04)

(56) References Cited

U.S. PATENT DOCUMENTS

| | | | | | |
|---|---|---|---|---|---|
| 4,888,387 | A | * | 12/1989 | Wada | C08L 25/14 525/66 |
| 4,963,644 | A | * | 10/1990 | Duh | C08G 63/80 528/272 |
| 5,066,536 | A | * | 11/1991 | Cogswell | B29C 66/721 428/216 |
| 5,294,695 | A | * | 3/1994 | Lee | C08G 63/78 528/275 |
| 5,329,687 | A | * | 7/1994 | Scott | H01P 1/205 29/527.2 |
| 5,739,193 | A | * | 4/1998 | Walpita | C08K 3/22 361/321.4 |
| 5,767,223 | A | * | 6/1998 | Yamada | C08G 63/605 428/480 |
| 5,866,025 | A | * | 2/1999 | Kataoka | B29C 33/40 249/114.1 |
| 5,962,122 | A | * | 10/1999 | Walpita | C08K 3/22 428/325 |
| 6,057,035 | A | * | 5/2000 | Singh | B82Y 30/00 428/403 |
| 6,162,849 | A | * | 12/2000 | Zhuo | C08K 3/38 524/404 |
| 6,384,128 | B1 | * | 5/2002 | Wadahara | C08K 3/04 524/496 |
| 6,503,964 | B2 | | 1/2003 | Smith et al. | |
| 6,528,145 | B1 | * | 3/2003 | Berger | H01L 21/4857 174/256 |
| 6,620,497 | B2 | | 9/2003 | Smith et al. | |
| 6,730,731 | B2 | * | 5/2004 | Tobita | C08K 7/06 257/E23.09 |
| 7,847,658 | B2 | | 12/2010 | Lyons et al. | |
| 8,029,889 | B1 | * | 10/2011 | Li | C08G 61/12 428/292.1 |
| 8,072,298 | B2 | | 12/2011 | Kim et al. | |
| 9,346,991 | B2 | * | 5/2016 | Arzberger | C09K 5/14 |
| 2002/0062950 | A1 | | 5/2002 | McCullough et al. | |
| 2003/0181560 | A1 | * | 9/2003 | Kawaguchi | B32B 15/08 524/424 |
| 2005/0136876 | A1 | | 6/2005 | Broholm | |
| 2005/0191515 | A1 | * | 9/2005 | Brese | B82Y 30/00 428/633 |
| 2005/0272845 | A1 | * | 12/2005 | Miller | C08K 3/38 524/430 |
| 2006/0119454 | A1 | * | 6/2006 | Kornowski | H01P 7/06 333/227 |
| 2006/0188727 | A1 | * | 8/2006 | Ito | C08K 7/00 428/413 |
| 2007/0045823 | A1 | * | 3/2007 | Miller | H01L 23/295 257/706 |
| 2007/0080162 | A1 | * | 4/2007 | Miller | B65D 1/34 220/592.2 |
| 2007/0121648 | A1 | * | 5/2007 | Hahn | H04B 1/18 370/401 |
| 2007/0148467 | A1 | * | 6/2007 | St. Lawrence | B82Y 10/00 428/411.1 |
| 2008/0113187 | A1 | * | 5/2008 | Toyouchi | B32B 15/08 428/336 |
| 2008/0153959 | A1 | * | 6/2008 | Charati | C08K 3/04 524/404 |
| 2008/0166563 | A1 | * | 7/2008 | Brittingham | C08J 3/18 428/411.1 |
| 2008/0188626 | A1 | * | 8/2008 | Verghese | C08L 63/00 525/407 |
| 2008/0213489 | A1 | * | 9/2008 | Verghese | C08J 5/24 427/386 |
| 2008/0260955 | A1 | * | 10/2008 | Hoyles | C08L 63/00 427/386 |
| 2008/0308212 | A1 | * | 12/2008 | Sheasley | C08G 59/502 156/78 |
| 2009/0043026 | A1 | * | 2/2009 | Tanaka | C08K 3/34 524/277 |
| 2009/0082486 | A1 | * | 3/2009 | Bates | C08L 63/00 522/170 |
| 2009/0123759 | A1 | * | 5/2009 | Pham | C09J 171/02 428/414 |
| 2009/0189177 | A1 | * | 7/2009 | Lee | B29C 43/18 257/99 |
| 2010/0020741 | A1 | * | 1/2010 | Hahn | H04B 7/2606 370/315 |
| 2010/0193830 | A1 | * | 8/2010 | Lin | H01L 21/486 257/99 |
| 2010/0197848 | A1 | * | 8/2010 | Verghese | C08L 63/00 524/502 |
| 2011/0040007 | A1 | * | 2/2011 | Chandrasekhar | H01B 1/22 524/404 |
| 2011/0103021 | A1 | | 5/2011 | Janssen et al. | |
| 2011/0230625 | A1 | * | 9/2011 | Kurachi | C08L 67/02 525/439 |
| 2012/0153217 | A1 | * | 6/2012 | Saga | C08K 3/22 252/75 |
| 2012/0157630 | A1 | * | 6/2012 | Navarro | C08F 6/006 525/67 |
| 2012/0286194 | A1 | * | 11/2012 | Hirano | C09K 5/14 252/73 |
| 2015/0116058 | A1 | * | 4/2015 | Lee | H01P 7/10 333/202 |
| 2015/0223288 | A1 | * | 8/2015 | Esseghir | B22F 3/1103 428/306.6 |

(56) References Cited

U.S. PATENT DOCUMENTS

| | | | |
|---|---|---|---|
| 2015/0225815 A1* | 8/2015 | Esseghir | B22F 3/1112 |
| | | | 420/402 |
| 2015/0236391 A1* | 8/2015 | Esseghir | H01P 1/207 |
| | | | 428/613 |
| 2015/0299457 A1* | 10/2015 | Fu | C08L 63/00 |
| | | | 428/626 |

OTHER PUBLICATIONS

"Coefficients of Linear Thermal Expansion," obtained May 18, 2017, The Engineering Toolbox, http://www.engineeringtoolbox.com/linear-expansion-coefficients-d_95.html.*

"Silicon Oxide—Wikipedia" (https://en.wikipedia.org/wiki/Silicon_oxide) (webpage retrieved Jan. 17, 2018).*

"Boron Nitride—Wikipedia" (https://en.wikipedia.org/wiki/Boron_nitride) (webpage retrieved Jan. 17, 2018).*

"Azom—Silicon Dioxide" (https://web.archive.org/web/20110516131158/https://www.azom.com/article.aspx?ArticleID=1114) (archive of webpage on May 16, 2011).*

<http://www.rfsworld.com/index.php?p=285&I=1&listName=whitepapers&indexVal=10> . Retrieved Nov. 18, 2015.

<http://wenku.baidu.com/view/c68621eff8c75fbfc77db299.html>, Retrieved Nov. 18, 2015.

PCT/US2013/069824, International Search Report and Written Opinion dated Feb. 10, 2014.

PCT/US2013/069824, International Preliminary Report on Patentability dated Jun. 23, 2015.

* cited by examiner

POLYMER COMPOSITE COMPONENTS FOR WIRELESS-COMMUNICATION TOWERS

REFERENCE TO RELATED APPLICATIONS

The present application claims the benefit of U.S. Provisional Application No. 61/739,839, filed on Dec. 20, 2012.

FIELD

Various embodiments of the present invention relate to polymer composite-based components for use on wireless-communication towers.

INTRODUCTION

In the telecommunications field, it is expected that bandwidth demand will increase annually across the world to support new services and increased numbers of users, thus shifting wireless systems to higher frequency bands. There is a trend in the industry to move base-station electronics from the tower base to the upper regions of wireless-communications towers (i.e., tower-top electronics); this is an effort to reduce signal losses in telecommunication cables connecting the tower top to the base equipment. As increasing numbers of components are moved up the tower, the weight of such components becomes a concern.

SUMMARY

One embodiment is an apparatus, comprising:
a wireless-communications-tower component being at least partially formed from a polymer composite,
wherein said polymer composite comprises a thermoplastic polymer and a filler,
wherein said thermoplastic polymer is non-foamed,
wherein said polymer composite has a thermal conductivity of at least 0.5 watt per meter Kelvin ("W/m·K") measured at 25° C.

BRIEF DESCRIPTION OF THE DRAWINGS

Reference is made to the accompanying drawings in which.

DETAILED DESCRIPTION

Various embodiments of the present invention concern a wireless-communications-tower component being at least partially formed from a polymer composite. Such a polymer composite can have certain properties making it suitable for tower-top applications, including certain ranges or values for density, thermal conductivity, glass transition, flammability resistance, and coefficient of thermal expansion, among others. Such wireless-communications-tower components can include radio frequency ("RF") cavity filters, heat sinks, enclosures, and combinations thereof, among others.

Polymer Composite

As just noted, the wireless-communications-tower component can be at least partially formed from a polymer composite. As used herein, "polymer composites" are compositions comprising a polymer matrix having one or more fillers dispersed throughout the polymer matrix. In various embodiments, the filler or fillers can be uniformly or substantially uniformly distributed throughout the polymer matrix. Additionally, the polymer composites can further comprise one or more additives, as described below.

Polymers suitable for use as the polymer matrix are thermoplastic polymers. As known in the art, "thermoplastic polymers" are polymers that undergo a phase change upon heating. For instance, thermoplastic polymers may turn into a viscous fluid when heated that can be made to flow upon application of a stress in appropriate processing equipment. Conversely, a thermoplastic polymer "freezes" to a rigid state when cooled below its melting or glass transition temperature. Thermoplastic polymers suitable for use herein are non-foamed thermoplastic polymers. As used herein, "non-foamed" denotes a thermoplastic polymer that has not undergone any process to intentionally incorporate gas-filled void space, such as pores (i.e., closed-cell), tunnels (i.e., open-cell), or hollowed spaces (e.g., by using hollow fillers), in the thermoplastic polymer. It should be noted that incidental incorporation of void spaces in the thermoplastic polymer due to other processing or manufacturing techniques (e.g., molding) does not disqualify a thermoplastic polymer from being "non-foamed." In an embodiment, the non-foamed thermoplastic polymer can have a density or specific gravity that is at least 90%, at least 95%, or at least 98% of the density of a void-free thermoplastic polymer of the same composition. Additionally, thermoplastic polymers can be either amorphous (e.g., polystyrene, polycarbonate, or polysulfone) or semi-crystalline (e.g., polyethylene or polypropylene). In certain embodiments, the thermoplastic polymer suitable for use herein is amorphous. As used herein, the term "amorphous" denotes a polymer having virtually no crystallinity (e.g., less than 2.5% crystallinity, and preferably none) and exhibiting only a glass transition temperature ("$T_g$") and no melting point ("$T_m$") discernable by known techniques such as differential scanning calorimetry ("DSC").

In one or more embodiments, the thermoplastic polymer can have a glass transition temperature ("Tg") of at least 100° C., or in the range of from 100 to 300° C., from 105 to 280° C., from 110 to 250° C., from 125 to 225° C., or from 140 to 200° C. Glass transition temperature is measured according to the procedure provided in the Test Methods section, below. Additionally, the thermoplastic polymer can have a density or specific gravity relative to water of less than 2.7 grams per cubic centimeter ("g/cm$^3$"), or less than 2.0 g/cm$^3$, less than 1.8 g/cm$^3$, less than 1.6 g/cm$^3$, less than 1.5 g/cm$^3$, less than 1.5 g/cm$^3$, less than 1.4 g/cm$^3$, or less than 1.35 g/cm$^3$. Furthermore, the thermoplastic polymer can have a density or specific gravity relative to water in the range of from 1.0 to 1.6 g/cm$^3$, from 1.05 to 1.5 g/cm$^3$, from 1.1 to 1.4 g/cm$^3$, or from 1.15 to 1.35 g/cm$^3$. Density and specific gravity values for polymers and polymer composites provided herein are measured at 25° C. in accordance with ASTM D792.

In various embodiments, the thermoplastic polymer can have a linear, isotropic coefficient of thermal expansion ("CTE") of less than 75 micrometers per meter Kelvin ("μm/m·K," which is equivalent to ppm/° C.), less than 70 μm/m·K, less than 60 μm/m·K, less than 50 μm/m·K, or less than 40 μm/m·K. In such embodiments, the thermoplastic polymer can have a CTE of at least 10 μm/m·K. All CTE values provided herein are measured according to the procedure provided in the Test Methods section, below. Additionally, values provided for CTE should stay within the recited range (e.g., less than 60 μm/m·K) over a temperature range of from −50° C. to 100° C. As used herein, "isotropic" or "isotropicity" means, when heated within an operating temperature range (e.g., −50° C. to 100° C.), the dimensional change as defined by the CTE of the material (e.g., the thermoplastic polymer or the polymer composite) is substantially similar in all dimensions (i.e., x, y, and z). "Substantially similar" herein means difference in CTE that is generally less than 60%, less than 50%, less than 40%, and less than 25%, or less than 10% between any two dimensions. In an embodiment, the difference in CTE is zero or substantially zero between any two dimensions.

Examples of thermoplastic polymers suitable for use herein include polycarbonates, polysulfones (e.g., polyphenylsulfones and polyethersulfones), polyamideimides, polyarylates, polyesters, polyphenylenes, polyphenylene oxides, polyphenylene sulfides, polyether ketones, polyetherether ketones, polyarylether ketones, polyamides, polyarylamides, polyphthalamides, and polyetherimides. Additional thermoplastic polymers could also include thermotropic liquid crystal polymers. Specific polycarbonates suitable for use include, but are not limited to, poly(bisphenol-A-carbonate) and poly(bisphenol-A-carbonate)-based copolymers. Specific polysulfones suitable for use include, but are not limited to, polyarylethersulfone, polyphenylsulfones, polyethersulfones, and copolymers containing one or more of these sulfones. Furthermore, the thermoplastic polymer suitable for use herein can be a mixture of any two or more of the above-described thermoplastic polymers. In an embodiment, the thermoplastic polymer is a mixture of a polysulfone and a polycarbonate. In an embodiment, the thermoplastic polymer can be a polycarbonate. In an embodiment, the thermoplastic polymer can be a polysulfone.

Examples of commercially available thermoplastic polymers suitable for use herein include LEXAN™ 221, a polycarbonate available from Sabic Innovative Plastics, Pittsfield, Mass., USA; MAKROLON™ 2207, or APEC™ 1697, both polycarbonates available from Bayer MaterialScience AG, Leverkusen, Germany; ULTRASON™ S2010, a polysulfone available from BASF Corporation, Wyandotte, Mich., USA; and UDEL™ P1700, a polysulfone available from Solvay Specialty Polymers USA, LLC, Augusta, Ga., USA.

Fillers suitable for use in the polymer composite can include various fillers known or hereafter discovered in the art. In various embodiments, the filler or fillers employed can be selected to provide the desired balance of properties of the overall polymer composite, considering the target CTE, Tg, thermal conductivity, flame retardancy, and/or density of the polymer composite. For example, fillers may be selected to achieve a polymer composite having a thermal conductivity of at least 0.5 W/m·K, a CTE of less than 50 μm/m·K, a Tg of at least 120° C., and a density of less than 2.1 g/cm³. Suitable fillers for use herein can be in various physical forms, such as particulates, granules, grains, spheres, flakes, and powder, among others. In various embodiments, suitable fillers can have a low length-to-width aspect ratio. For example, in certain embodiments, the fillers can have an aspect ratio of less than 4:1, less than 3:1, less than 2:1, or about 1:1. Additionally, fillers may be surface treated to enhance interaction with the thermoplastic polymer or improve the processability while potentially leading to improved mechanical performance as compared to fillers not surface treated. Many filler surface treatments are known in the art, but silane surface treatments are often highly desirable. In an embodiment, the average particle size ($d_{50\%}$) of the filler can be in the range of from 0.5 to 500 μm, from 1 to 300 μm, or from 5 to 100 μm.

In one or more embodiments, the filler can have a density of less than 4.0 g/cm³, less than 3.0 g/cm³, less than 2.9 g/cm³, less than 2.8 g/cm³ or less than 2.7 g/cm³. Additionally, the filler can have a density ranging from 1.5 to 4.0 g/cm³, from 1.6 to 2.9 g/cm³, or from 1.7 to 2.7 g/cm³. Density of the filler is determined according to ISO 787-10 "General methods of test for pigments and extenders—Part 10—Determination of density: Pyknometer method." In various embodiments, the filler can have a CTE of less than 55 μm/m·K, less than 35 μm/m·K, less than 25 μm/m·K, less than 20 μm/m·K, or less than 15 μm/m·K. Additionally, the filler can have a CTE ranging from 0 to 55 μm/m·K, from 0.25 to 20 μm/m·K, or from 0.5 to 15 μm/m·K. In further embodiments, the filler can have a thermal conductivity of at least 0.5 W/m·K, at least 1.0 W/m·K, or at least 1.5 W/m·K. Furthermore, certain fillers (e.g., zirconium tungstate) can have a negative CTE. Such fillers may be known in the art as NTE, or negative thermal expansion, fillers. Thus, in various embodiments, the filler can have a negative CTE, which can be as low as −9 or −10 μm/m·K. Additionally, the filler can have a thermal conductivity ranging from 0.5 to 4,000 W/m·K, from 1 to 1000 W/m·K, of from 5 to 500 W/m·K, from 10 to 400 W/m·K.

In various embodiments, it may be desirable to employ a blend of different fillers to achieve the desired properties just described. For example, one filler type may be selected for its high thermal conductivity, while another filler type may be selected for its reinforcing attributes as indicated by mechanical properties, while yet another filler type may be selected for its low CTE value. In still another embodiment, one filler type may be selected for having two of such desired properties, while a second filler type provides one or more other desired property. By way of example, the polymer composite can comprise a first filler type having a CTE of less than 30 μm/m·K, a second filler type having a thermal conductivity of greater than 5 W/m·K, and a third filler type for mechanical properties. In an embodiment, at least one filler type can have a linear, isotropic CTE of less than 30 μm/m·K, less than 25 μm/m·K, less than 20 μm/m·K, less than 15 μm/m·K, less than 10 μm/m·K, less than 5 μm/m·K, or less than 1 μm/m·K. In an embodiment, at least one filler type can have a thermal conductivity of at least 5 W/m·K, at least 7 W/m·K, at least 10 W/m·K, at least 20 W/m·K, at least 50 W/m·K, or even greater than 100 W/m·K.

Table 1, below, provides a list of exemplary fillers suitable for use herein, along with their properties:

TABLE 1

Fillers and Their Properties

| Filler | Density (g/cm³) | CTE (μm/m · K) | Thermal Conductivity (W/m · K) |
|---|---|---|---|
| Quartz | 2.7 | 14.0 | 9.0 |
| Fused Silica/Quartz | 2.2 | 0.5 | 1.5 |
| Aluminum Flakes | 2.7 | 23.0 | 220.0 |
| Magnesium Powder | 1.7-1.8 | 25.0 | 70-100 |

TABLE 1-continued

Fillers and Their Properties

| Filler | Density (g/cm³) | CTE (μm/m · K) | Thermal Conductivity (W/m · K) |
|---|---|---|---|
| Carbon Fiber | 1.8 | ~0 | 180.0 |
| Graphite | 1.9-2.2 | 1.2-8 | 25-470 |
| Graphene | — | ~6 | 4,000 |
| Expanded Graphite | 2.08-2.30 | — | — |

Fillers useful in the embodiments described herein may include, for example, one or more surface-treated fillers to improve filler and polymer interaction, one or more non-surface-treated fillers, one or more electrically and/or thermally conductive fillers, one or more non-conductive fillers, and mixtures thereof. For example, fillers falling within the following classes may be employed: metal particles, nanoscale particles, metal oxides, metal nitrides, metal carbides, metal hydroxides, metal carbonates, metal sulfates, natural and synthetic minerals (mainly silicates and aluminum silicates), and mixtures of two or more thereof.

Specific examples of the fillers useful herein include quartz, silica, silicon oxide, fused silica, fused quartz, natural silica, synthetic silica, natural aluminum oxide, synthetic aluminum oxide, aluminum trihydroxide, aluminum-oxide-hydroxide, magnesium hydroxide, aluminum hydroxide oxide, boron nitride, aluminum nitride, silicon nitride, silicon carbide, mica, calcium carbonate, lithium aluminum silicate, zinc oxide, aluminum nitride, mullite, wollastonite, talcum, glimmer, kaolin, bentonite, boehmite, xonolit, andalusite, zeolithe, dolomite, vermiculite, muscovite, nephheline, albite, microline, slate, aluminum powder, silver, graphite, synthetic graphite, natural graphite, amorphous graphite, flake graphite, vein graphite, expandable/intumescent graphite, antimony oxides, borates (including zinc borates and sodium borates), molybdates (including calcium molybdate and zinc molybdate), stannates (including zinc stannate), phosphinates (including aluminum phosphinates, aluminum phosphinite), ammonium polyphosphate, melamine polyphosphate, melamine salts, zinc sulfide, red phosphorous, layered clays (including montmorillonite and hectorite), gold, carbon, single or multi-wall carbon nanotubes, graphene, glass powder, glass fibers, glass fabric, glass sheets, carbon fibers, other organic or inorganic particulate fillers or mixtures thereof.

In various embodiments, the filler can be a combination of filler types selected from the group consisting of (a) fused quartz and carbon fiber, (b) fused quartz and expanded graphite, (c) quartz and graphite, (d) quartz and expanded graphite, (e) quartz, graphite, and expanded graphite, and (e) quartz, fused quartz, and expanded graphite, (f) quartz and expanded graphite and carbon fibers, (g) fused quartz and graphite, and (h) quartz and carbon fiber.

Examples of commercially available fillers suitable for use herein include MILLISIL®, SIKRON®, SILBOND®, SIBELITE®, TREMIN®, TREFIL®, SILIPLAST®, ASPOLIT®, MICROSPAR®, MINEX®, TREMINEX®, and SEPASIL®, all sold by Quarzwerke Gruppe GmbH, Frechen, Germany. Suitable commercially available fillers also include TIMREX® KS44 graphite (particle size d50~30 microns, 0.06% ash content, 0.19 gr/cc density, surface BET=9.0, oil absorption 115 g DBP/100 gram) and C-THERM® 011 expanded graphite (2.5% maximum ash content, 0.19 gr/cc density, surface BET=25.0), both available from Timcal Graphite and Carbon, Bodio, CH, and PANEX® carbon fiber, available from Zoltek Corporation, St. Louis, Mo., USA.

In various embodiments, the thermoplastic polymer can be present in the polymer composite in an amount ranging from 20 to 70 weight percent ("wt %"), from 30 to 60 wt %, from 40 to 60 wt %, or from 40 to 57 wt %, based on the entire polymer composite weight. Additionally, the filler can be present in a total amount (i.e., combined weight of all filler types if more than one filler type is employed) ranging from 5 to 70 wt %, from 10 to 60 wt %, or from 10 to 50 wt %, based on the entire polymer composite weight. In another embodiment, the filler can be present in a total amount ranging from 30 to 80 wt %, based on the entire polymer composite weight. In one or more embodiments, the thermoplastic polymer and filler are present in the polymer composite in a weight ratio ranging from 1:4 to 4:1, from 1:3 to 3:1, or from 1:2 to 2:1.

The above-described polymer composite can further comprise one or more additional additives. For example, the polymer composite can comprise a flame retardant additive which can often contain halogen, phosphorus, and/or nitrogen atoms, but is not limited to such. Non-limiting examples of flame retardant additives include magnesium hydroxide; antimony oxide; red phosphorus; ammonium polyphosphate; ammonium phosphate; zinc borate; zinc molybdate; tetrabromobisphenol A; tetrabromobisphenol A diglycidylether and its oligomers; brominated diphenyl ether(s); brominated diphenylethane(s); hexabromocyclododecane; polycyclic chlorohydrocarbons; chloroparafins; stannates; molybdates, triglycidyl phosphate; 2-(6-oxido-6H-dibenzo[c,e][1,2]oxa-phosphorin-6-yl)1,4-benzenediol (DOPO-HQ); 9,10-dihydro-9-oxa-10-phosphaphenanthrene-10-oxide (DOPO) and its derivatives; phosphoramidates; 5,5-dimethyl-[1,3,2]dioxaphosphinane 2-oxde (DDPO) and its derivates; dimethyl phosphite and other organophosphates; diethyl phosphinic acid and other organophosphinic acids; ethylphosphonic acid and other organophosphonic acids; tris(4-hydroxyphenyl)phosphine oxide and other organophosphine oxides; bis(2-hydroxyphenyl)phenyl phosphinate and other organophosphinates; melamine polyphosphate; aluminum diethylphosphinate and other metal phosphinates; triphenylphosphate; resorcinol bis(diphenylphosphate); bisphenol A (diphenyl phosphate), other organophosphates, and oligomers thereof; dimethyl methylphosphonate, other organophosphonates, and oligomers thereof; and mixtures thereof. Whatever the flame retardant additive, if utilized, it can lead to a polymer composite that is at least UL-94 V2, at least UL-94 V1, and at least UL-94 V0 while maintaining a Tg greater than at least 100° C. while being sufficiently stable to be processed in the liquid state required for the polymer composite. Other examples of suitable flame retardants useful in the present invention and their classes may be found, for example, in a paper entitled "Flame Retardants—101 Basic Dynamics—Past Efforts Create Future Opportunities", presented at Fire Retardant Chemicals Association, Baltimore Marriot Inner Harbour Hotel, Baltimore Md., Mar. 24-27, 1996; *Materials* 2010, 3, 4300-4327; U.S. Pat. No. 6,645,631; WO 2004118604; and WO2008144252. When a flame retardant additive is employed, it can be present in an amount ranging from greater than 0 to 60 wt %, based on the entire polymer composite weight.

The polymer composite can be prepared according to any known or hereafter discovered techniques in the art for dispersing a filler, and optionally additives, in a thermoplastic polymeric material. For example, the above-described thermoplastic polymer, filler, and optional additives can be combined and compounded in a melt mixing operation, such as with an extruder, to produce pellets or granules of the polymer composite. Such pellets or granules can be employed to form the above-mentioned wireless-communications-tower component or parts thereof via conventional or hereafter discovered plastic forming methods, such as by injection molding or compression molding.

In various embodiments, the resulting polymer composite can have a thermal conductivity of at least 0.5 W/m·K, at least 0.6 W/m·K, at least 0.8 W/m·K, at least 1 W/m·K, at least 1.2 W/m·K, or at least 1.5 W/m·K. Additionally, the polymer composite can have a thermal conductivity ranging from 0.6 to 30 W/m·K, from 0.8 to 15 W/m·K, 1 to 5 W/m·K, or from 1 to 3.2 W/m·K. All thermal conductivity values provided herein are measured at 25° C. according to ISO 22007-2 (the transient plane heat source [hot disc] method).

In various embodiments, the polymer composite can have a density of less than 2.7 g/cm$^3$, less than 2.4 g/cm$^3$, less than 2.1 g/cm$^3$, less than 2.0 g/cm$^3$, less than 1.9 g/cm$^3$, less than 1.8 g/cm$^3$, or less than 1.7 g/cm$^3$. Additionally, the polymer composite can have a density ranging from 1.0 to 2.1 g/cm$^3$, from 1.1 to 2.0 g/cm$^3$, from 1.2 to 1.9 g/cm$^3$, from 1.3 to 1.8 g/cm$^3$, or from 1.4 to 1.7 g/cm$^3$.

In various embodiments, the polymer composite can have a linear, isotropic CTE over a temperature range of −50 to 100° C. of less than 60 µm/m·K, less than 55 µm/m·K, less than 50 µm/m·K, less than 47 µm/m·K, less than 45 µm/m·K, less than 43 µm/m·K, or less than 40 µm/m·K. Additionally, the polymer composite can have a linear, isotropic CTE over a temperature range of −50 to 100° C. ranging from 5 to 60 µm/m·K, from 10 to 55 µm/m·K, from 15 to 50 µm/m·K, from 17 to 47 µm/m·K, from 19 to 45 µm/m·K, from 21 to 43 µm/m·K, or from 22 to 40 µm/m·K. In one or more embodiments, the linear, isotropic CTE of the polymer composite can vary by less than 15 µm/m·K, less than 12 µm/m·K, less than 10 µm/m·K, less than 7 µm/m·K, or less than 5 µm/m·K between any two points over the entire polymer composite employed in forming a wireless-communications-tower component. As noted above, "isotropic" or "isotropicity" means, when heated within the operating temperature range, the dimensional change as defined by the CTE of the material (e.g., the thermoplastic polymer or the polymer composite) is substantially similar in all dimensions (i.e., x, y, and z). "Substantially similar" herein means a difference in CTE that is generally less than 60%, less than 50%, less than 40%, and less than 25%, or less than 10% between any two dimensions. In an embodiment, the difference in CTE is zero or substantially zero between any two dimensions. Thus, in various embodiments, the CTE of the polymer composite can vary by less than 60%, less than 50%, less than 40%, and less than 25%, or less than 10%, or be zero or substantially zero over the temperature range of from −50 to 100° C. between any two dimensions.

In various embodiments, the polymer composite can present low levels of dimensional change upon being subject to repeated cycles of thermal aging. In other words, the polymer composite can have superior dimensional stability. In an embodiment, a sample of the polymer composite prepared as described in Example 5, below, and having a thickness of 0.125 inches can present a dimensional change of less than 1%, less than 0.8%, or less than 0.6% upon heat-age cycling from −50 to 100° C. ten times, as described in Example 5. This dimensional change can be measured either in the transverse or the flow direction, and can be measured during each cycle at 25° C. When measured at 50° C., the dimensional change can be less than 0.4%, and when measured at 80° C., the dimensional change can be less than 0.3%. In addition, the ratio between the transverse-direction dimensional change and the flow-direction dimensional change (TD/FD) after 10 heat-age cycles as described in Example 5 when measured at 25° C. can be less than 1.8, less than 1.5, less than 1.2, or less than 1.0. In such embodiments, the ratio can be at least 0.1, at least 0.3, at least 0.5, or at least 0.7. In further embodiments, the TD/FD dimensional change after 10 heat-age cycles as described in Example 5 when measured at 50° C. can be less than 2.0, less than 1.6, less than 1.2, or less than 0.9. In such embodiments, the ratio can be at least 0.1, at least 0.3, at least 0.5, or at least 0.7. In still other embodiments, the TD/FD dimensional change after 10 heat-age cycles as described in Example 5 when measured at 80° C. can be less than 2.5, less than 1.8, less than 1.0, or less than 0.6. In such embodiments, the ratio can be at least 0.1, at least 0.2, at least 0.3, or at least 0.4.

In various embodiments, the polymer composite can have a Tg of at least 90° C., at least 95° C., or at least 100° C. Additionally, the polymer composite can have a Tg ranging from 90 to 250° C., from 95 to 220° C., or from 100 to 200° C.

Wireless-Communications-Tower Components

As noted above, the polymer composite can be employed to produce, at least in part, a wireless-communications-tower component. As used herein, "wireless-communications-tower component" denotes any piece of electronic communications equipment, global positioning system ("GPS") equipment, or similar equipment, or a part or portion thereof. Although the term "tower" is employed, it should be noted that such equipment need not actually be mounted or designed to be mounted on a tower; rather, other elevated locations such as radio masts, buildings, monuments, or trees may also be considered. Additionally, it is also contemplated that such components may be employed in tower base stations and are not necessarily limited to elevated locations. Examples of such components include, but are not limited to, antennas, transmitters, receivers, transceivers, digital signal processors, control electronics, GPS receivers, electrical power sources, and enclosures for electrical component housing. Additionally, components typically found within such electrical equipment, such as RF filters and heat sinks, are also contemplated.

As noted above, the wireless-communications-tower component can be an RF filter. An RF filter is a key element in a remote radio head. RF filters are used to eliminate signals of certain frequencies and are commonly used as building blocks for duplexers and diplexers to combine or separate multiple frequency bands. RF filters also play a key role in minimizing interference between systems operating in different bands.

An RF cavity filter is a commonly used RF filter. A common practice to make these filters of various designs and physical geometries is to die cast aluminum into the desired structure or machine a final geometry from a pre-form. RF filters, their characteristics, their usage, their fabrication, their machining, and their overall production are described, for example, in U.S. Pat. Nos. 7,847,658 and 8,072,298.

In various embodiments, at least a portion of the above-described polymer composite can be metal plated (i.e., metalized), as is typically done for RF cavity filters. For example, a metal layer such as copper, silver, or gold can be deposited on the polymer composite via various plating techniques. Examples of suitable plating techniques can be found, for example, in U.S. Provisional Patent Application Ser. No. 61/577,918.

By way of example, the metallization process can be carried out by initially processing a substrate part formed from the polymer composite via an appropriate pretreatment process, followed by electroless plating a thin layer (e.g., from about 0.25 micrometers ("µm") to about 2.5 µm) of metal, such as copper or nickel, onto the substrate part. For example, in an embodiment, a layer of copper may be plated onto the polymer composite, where the layer has a thickness of about 1 µm. The electroless plating may then be followed by plating a metal, such as copper, up to a thickness of about 20 µm, and thereafter another layer of metal, such as silver, may optionally be applied by plating to the desired thickness of the layer (e.g., about 1 µm). In another embodiment, multiple layers may be used or, in various embodiments, a single plating layer may be used.

In certain embodiments, additional metal layers may be conveniently applied over an initial metallization layer by using electrolytic plating techniques or other plating techniques, such as electroless deposition or immersion deposition. Typically, electrolytic processes are used for the addition of thicker layers. In an embodiment where an additional copper layer is desired, the layer could also be added using an electroless process (although deposition rate for the greater thickness may be lower). For an embodiment where a final silver layer is desired, the thickness is small; therefore, either electroless or immersion deposition can also be used.

Exemplary pretreatment methods include chemical acid/base etching and physical roughening (e.g., sandblasting) treatments. In one or more embodiments, the pretreatment method can include a chemical etching method, based on an initial conditioning step in an alkaline, solvent-containing solution, followed by treatment in a hot alkaline solution containing permanganate ion. Residues of the permanganate etch step can then be removed in a neutralization bath, containing an acidic solution of a hydroxylamine compound.

In an embodiment, the wireless-communications-tower component can be a heat sink. As known in the art, heat sinks, which can be a component employed in remote radio heads, typically comprise a base member and a heat spreading member (or "fins"). The heat spreading member is typically formed from a high conductivity material, such as copper. In an embodiment, heat sinks fabricated according to the present description can comprise a base member formed from the above-described polymer composite, while employing a conventional heat spreading member.

In various embodiments, the wireless-communications-tower component can be an enclosure that contains and/or protects electronic equipment. Examples of such enclosures can be, for example, an MRH-24605 LTE Remote Radio Head from MTI Inc.

In forming the wireless-communications-tower component, pellets or granules formed by the above-mentioned melt compounding procedure are formed into the desired geometry via known or hereafter discovered forming operations, such as by injection molding, compression molding, thermoforming, machining, or combinations of two or more thereof. Once the polymer composite has been molded into the desired shape, additional machining can be employed to drill holes, tap holes, and prepare the surface for metal plating. In various embodiments, holes can also be pre-molded in place so only threading is required post-molding. In yet another embodiment, threaded pins can be inserted during molding as a one-step process. When the wireless-communications-tower component is a filter device, such threaded holes can be used to fasten a cover plate or perform other functions needed for the proper operation of the filter device, such as tuning. In another embodiment, the filter body may be designed to accept a cover plate via alternative fastening mechanisms known in the art, such as matching grooves, and/or adhesive bonding. Following molding and machining, the polymer composite can be plated with a metal if desired.

TEST METHODS

Density

Density for composite samples is determined at 25° C. in accordance with ASTM D792.

Thermal Conductivity

Thermal conductivity is determined according to ISO 22007-2 (the transient plane heat source (hot disc) method).

Coefficient of Thermal Expansion

CTE is determined using a Thermomechanical Analyzer (TMA 2940 from TA Instruments). An expansion profile is generated using a heating rate of 5° C./minute, and the CTE is calculated as the slope of the expansion profile curve as follows: CTE=ΔL/(ΔT×L) where ΔL is the change in sample length (µm), L is the original length of the sample (m) and ΔT is the change in temperature (° C.). The temperature range over which the slope is measured is 20° C. to 60° C. on the second heat.

Glass Transition Temperature (Tg)

Measure Tg by placing a sample in a dynamic mechanical analyzer ("DMA") with heating and cooling at 5° C./minute at a first heating scan of from −50 to 200° C. to a second heating scan of from −50 to 200° C. Tg is reported as the first onset of a peak in tangent delta on the second heating scan of from −50 to 200° C.

Flame Retardancy

Flame retardancy is tested in accordance with Underwriters Laboratories Inc. UL 94 standard for safety "Tests for Flammability of Plastic Materials for Parts in Devices and Appliances."

EXAMPLES

Example 1—Polysulfone-Based Polymer Composites

Prepare 20 polysulfone-based polymer composite samples (S1-S20) having compositions shown in Table 2, below, according to the following procedure. Before compounding, dry the polysulfone resin at 150° C. in a vacuum oven overnight. Combine the polysulfone resin with the fillers in a 40 cm³ Brabendar mixing bowl with type 6 head roller blades. Employing a compounding temperature of 330° C., mix at a speed of 20 rpm for 5 minutes, followed by mixing at 30 rpm for 6 minutes. Plaques of thickness 0.075 inch to 0.125 inch are prepared by compression molding at 330° C. on a Genesis 30-ton hydraulic press. The molding conditions are 330° C. with a force of 100 to 500 lbs for 7 minutes and 50,000 to 60,000 lbs for 5 minutes. Samples are then cooled at ambient conditions.

The polysulfone employed in these examples is ULTRASON® S2010, which is a low-viscosity injection-molding grade chemically comprised of poly(arylethersulfone). It has a density of 1.24 g/cm³, a longitudinal CTE of 53 µm/m·K from 23 to 80° C., and a Tg of approximately 190° C. ULTRASON® S2010 is available from BASF Corporation, Wyandotte, Mich., USA. The quartz filler employed in these examples is SILBOND® W12est, which has a density of 2.65 g/cm³, a CTE of 14 µm/m·K from 20 to 300 K, and a thermal conductivity of 9 W/m·K, and is available from Quarzwerke Gruppe GmbH, Frechen, Germany. The fused quartz filler employed in these examples is SILBOND® FW12est, with a density of 2.20 g/cm³, a CTE of 0.5 μm/m·K from 20 to 300 K, and a thermal conductivity of 1.5 W/m·K, and is available from Quarzwerke Gruppe GmbH, Frechen, Germany. The carbon fiber filler employed in these examples is PANEX® 35 milled carbon fiber with a density of 1.81 g/cm³, A fiber diameter of 7.2 μm, and average fiber length of 100 μm, and is available from Zoltek Corporation, St. Louis, Mo., USA. The graphite employed in these examples is TIMREX® KS44 synthetic graphite with an irregular spheroid particle shape, typical particle size 45 μm, and density of 2.2 g/cm³, and is available from Timcal Graphite and Carbon, Bodio, CH. The expanded graphite employed in these examples is TIMREX® C-therm, with a density of 2.2 g/cm³, which is available from Timcal Graphite and Carbon, Bodio, CH.

TABLE 2

Sample Compositions S1-21

| Sample No. | Thermoplastic Polymer Polysulfone (wt %) | Quartz (wt %) | Fused Quartz (wt %) | Carbon Fiber (wt %) | Graphite (wt %) | Expanded Graphite (wt %) | Total |
|---|---|---|---|---|---|---|---|
| S1  | 51   | —    | —    | 49 | —    | —   | 100 |
| S2  | 48   | —    | 29   | 23 | —    | —   | 100 |
| S3  | 41   | —    | 53   | —  | —    | 6   | 100 |
| S4  | 57   | —    | 39   | —  | —    | 4   | 100 |
| S5  | 41   | —    | 49   | —  | —    | 10  | 100 |
| S6  | 41   | —    | 44   | —  | —    | 15  | 100 |
| S7  | 53   | 37   | —    | —  | 10   | —   | 100 |
| S8  | 53.6 | 32.8 | —    | —  | 13.6 | —   | 100 |
| S9  | 53   | 37   | —    | —  | 9    | 1   | 100 |
| S10 | 53   | 37   | —    | —  | 5    | 5   | 100 |
| S11 | 53   | 37   | —    | —  | 1    | 9   | 100 |
| S12 | 53.6 | 32.8 | —    | —  | 6.8  | 6.8 | 100 |
| S13 | 54   | 29   | —    | —  | 15   | 2   | 100 |
| S14 | 54   | 28.9 | —    | —  | 8.6  | 8.6 | 100 |
| S15 | 53   | 39   | —    | —  | 8    | —   | 100 |
| S16 | 53   | 40   | —    | —  | 7    | —   | 100 |
| S17 | 53   | 42   | —    | —  | 5    | —   | 100 |
| S18 | 53   | 39   | —    | —  | 7    | 1   | 100 |
| S19 | 52.9 | 40.4 | —    | —  | 5.4  | 1.3 | 100 |
| S20 | 53   | 42   | —    | —  | 4    | 1   | 100 |

Analyze the above-described Samples according to the procedures described above and compare to five Comparative Samples (CS A-CS E), also analyzed according to the above-described procedures. CS A is 100 wt % aluminum, which is a typical 6061 alloy. CS B is 100 wt % ULTEM™ 3452, which is a polyetherimide containing 45 percent glass fiber and mineral filler, commercially available from GE Plastics. CS C is 100 wt % ULTEM™ 2300, which is a polyetherimide containing 30 percent glass fiber filler, commercially available from GE Plastics. CS D is 100 wt % polysulfone, as described above. CS E is PETRA™ 130FR, which is a polyethylene terephthalate having 30 percent glass fiber filler, commercially available from BASF.

The results of the analyses of S1-20 and CS A-E are provided in Table 3, below.

TABLE 3

Sample Properties S1-20 and CS A-E

| Sample No. | Density (g/cm³) | Coefficient of Thermal Expansion (μm/m · K) | Thermal Conductivity (W/m · K) | Glass Transition Temperature (° C.) | Platable** | UL94 Flame Retardancy |
|---|---|---|---|---|---|---|
| S1 | 1.46 | 41  | 0.81 | N/D | N/D | N/D |
| S2 | 1.53 | 42  | 0.64 | N/D | N/D | N/D |
| S3 | 1.7  | 33  | 1.09 | N/D | Yes | N/D |
| S4 | 1.5  | 39  | 0.86 | N/D | Yes | N/D |
| S5 | 1.7  | N/D | 1.45 | 166 | N/D | N/D |
| S6 | 1.7  | 39  | 2.27 | 165 | N/D | N/D |
| S7 | 1.6  | 43  | 0.78 | 169 | Yes | V0 |

TABLE 3-continued

Sample Properties S1-20 and CS A-E

| Sample No. | Density (g/cm³) | Coefficient of Thermal Expansion (μm/m · K) | Thermal Conductivity (W/m · K) | Glass Transition Temperature (° C.) | Platable** | UL94 Flame Retardancy |
|---|---|---|---|---|---|---|
| S8 | 1.5 | 45 | 1.05 | 168 | N/D | V0 |
| S9 | 1.6 | 44 | 0.93 | N/D | N/D | V0 |
| S10 | 1.6 | 46 | 1.5 | N/D | N/D | V1 |
| S11 | 1.6 | 48 | 1.75 | N/D | N/D | V1 |
| S12 | 1.6 | 49 | 1.7 | N/D | N/D | V1 |
| S13 | 1.6 | 49 | 1.4 | N/D | N/D | V1 |
| S14 | 1.6 | 54 | 2.83 | N/D | N/D | V1 |
| S15 | 1.6 | 43 | 0.78 | N/D | Yes | V0 |
| S16 | 1.6 | 45 | 0.76 | N/D | Yes | V0 |
| S17 | 1.6 | 44 | 0.67 | N/D | Yes | V0 |
| S18 | 1.6 | 43 | 0.9 | N/D | Yes | V0 |
| S19 | 1.6 | 45 | 0.87 | N/D | Yes | V0 |
| S20 | 1.6 | 42 | 0.79 | N/D | Yes | V0 |
| CS A | 2.7* | 22 | 237* | N/A | Yes | N/D |
| CS B | 1.66* | 19 (flow)/36 (x-flow)* | N/D | 217* | N/D | N/D |
| CS C | 1.51* | 20 (flow)* | 0.29* | 217* | N/D | N/D |
| CS D | 1.24* | 53* | 0.26* | 190 | N/D | N/D |
| CS E | 1.7 | 35 | N/D | 90 | N/D | N/D |

N/D = Not Determined
*Properties not measured; data reported obtained from literature
**Plating procedure followed according to the description provided in U.S. Provisional Pat. application Ser. No. 61/577,918

As seen in Table 3, Samples S1-20 have low densities relative to conventional aluminum (CS A) and have higher thermal conductivities compared to incumbent polymer-based materials (CS B to CS D) while providing acceptable coefficients of thermal expansion. Additionally, Samples S1-20 provide superior glass transition temperature compared to glass-filled polyethylene terephthalate (CS E).

Example 2—Polycarbonate-Based Polymer Composites

Prepare six polycarbonate-based polymer composite Samples (S21-S26) having the compositions shown in Table 4 and using the method described in Example 1. The polycarbonate employed in these examples is LEXAN® 221, which is a poly(bisphenol-A-carbonate) having a density of 1.2 g/cm³, a thermal conductivity of 0.25 W/m·K, a CTE of 68 μm/m·K from −40 to 95° C. in the flow direction, and a Tg of about 153° C. LEXAN® 221 is available from Sabic Innovative Plastics, Pittsfield, Mass., USA. All other components are the same as described in Example 1.

TABLE 4

Sample Compositions S21-26

| | Thermoplastic | Filler | | | | | |
|---|---|---|---|---|---|---|---|
| Sample No. | Polymer Polycarbonate (wt %) | Quartz (wt %) | Fused Quartz (wt %) | Carbon Fiber (wt %) | Graphite (wt %) | Expanded Graphite (wt %) | Total |
| S21 | 40 | — | 36 | — | — | 24 | 100 |
| S22 | 40 | — | 54 | — | — | 6 | 100 |
| S23 | 40 | — | 50 | — | — | 10 | 100 |
| S24 | 40 | — | 45 | — | — | 15 | 100 |
| S25 | 56 | — | 33 | — | — | 11 | 100 |
| S26 | 56 | — | 30 | — | — | 15 | 100 |

Analyze Samples S21-26 according to the procedures described above. The results of the analyses of S21-26 are provided in Table 5, below, as well as the results of the CS A-E analyses described above for comparison.

TABLE 5

Sample Properties S21-26 and CS A-E

| Sample No. | Density (g/cm³) | Coefficient of Thermal Expansion (μm/m · K) | Thermal Conductivity (W/m · K) | Glass Transition Temperature (° C.) | Platable** |
|---|---|---|---|---|---|
| S21 | 1.6 | 39 | 3.13 | N/D | N/D |
| S22 | 1.6 | 39 | 1.32 | N/D | N/D |
| S23 | 1.6 | 42 | 2.11 | 114 | N/D |
| S24 | 1.6 | 46 | 2.33 | 114 | N/D |
| S25 | 1.4 | 50 | 1.9 | 101 | N/D |
| S26 | 1.5 | 47 | 2.62 | N/D | N/D |
| CS A | 2.7* | 22 | 237* | N/A | Yes |
| CS B | 1.66* | 19 (flow)/36 (x-flow)* | N/D | 217* | N/D |
| CS C | 1.51* | 20 (flow)* | 0.29* | 217* | N/D |

TABLE 5-continued

Sample Properties S21-26 and CS A-E

| Sample No. | Density (g/cm$^3$) | Coefficient of Thermal Expansion (μm/m · K) | Thermal Conductivity (W/m · K) | Glass Transition Temperature (° C.) | Platable** |
|---|---|---|---|---|---|
| CS D | 1.24* | 53* | 0.26* | 190 | N/D |
| CS E | 1.7 | 35 | N/D | 90 | N/D |

N/D = Not Determined
*Properties not measured; data reported obtained from literature
**Plating procedure followed according to the description provided in U.S. Provisional Patent Application Ser. No. 61/577,918

As seen in Table 5, Samples S21-26 have low densities relative to conventional aluminum (CS A) and have higher thermal conductivities compared to incumbent polymer-based materials (CS B to CS D) while providing acceptable coefficients of thermal expansion. Additionally, Samples S21-26 provide superior glass transition temperature compared to glass-filled polyethylene terephthalate (CS E).

Example 3—Polysulfone and Polycarbonate Polymer Blend Composites

Prepare ten polymer blend composite Samples (S27-S36), having both polysulfone and polycarbonate, according the compositions shown in Table 6 and using the method described in Example 1. All components are the same as described in Example 1.

TABLE 6

Sample Compositions S27-36

| | Thermoplastic Polymer | | Filler | | | | | |
|---|---|---|---|---|---|---|---|---|
| Sample No. | Polysulfone (wt %) | Polycarbonate (wt %) | Quartz (wt %) | Fused Quartz (wt %) | Carbon Fiber (wt %) | Graphite (wt %) | Expanded Graphite (wt %) | Total |
| S27 | 5 | 35 | — | 50 | — | — | 10 | 100 |
| S28 | 5 | 35 | — | 45 | — | — | 15 | 100 |
| S39 | 12 | 44 | — | 33 | — | — | 11 | 100 |
| S30 | 51 | 3 | 33 | — | — | 14 | — | 100 |
| S31 | 50 | 4 | 37 | — | — | 10 | — | 100 |
| S32 | 42 | 11 | 37 | — | — | 10 | — | 100 |
| S33 | 35 | 18 | 37 | — | — | 10 | — | 100 |
| S34 | 27 | 26 | 37 | — | — | 10 | — | 100 |
| S35 | 19 | 33 | 37 | — | — | 10 | — | 100 |
| S36 | 12 | 41 | 37 | — | — | 10 | — | 100 |

Analyze Samples S27-36 according to the procedures described above. The results of the analyses of S27-36 are provided in Table 7, below, as well as the results of the CS A-E analyses described above for comparison.

TABLE 7

Sample Properties S27-36 and CS A-E

| Sample No. | Density (g/cm$^3$) | Coefficient of Thermal Expansion (μm/m · K) | Thermal Conductivity (W/m · K) | Glass Transition Temperature (° C.) | Platable** | UL94 Flame Retardancy |
|---|---|---|---|---|---|---|
| S27 | 1.6 | 37 | 1.61 | 121 | N/D | N/D |
| S28 | 1.6 | 37 | 2.27 | 113 | N/D | N/D |
| S39 | 1.5 | 44 | 1.86 | 134 | N/D | N/D |
| S30 | 1.6 | 46 | 1.03 | 173 | N/D | V0 |
| S31 | 1.6 | 50 | 0.87 | 147 | N/D | V0 |
| S32 | 1.6 | 49 | 0.92 | 141 | N/D | V0 |
| S33 | 1.9 | 41 | 0.95 | 139 | N/D | V0 |
| S34 | 1.6 | 46 | 0.93 | 139 | N/D | V0 |
| S35 | 1.5 | 50 | 0.99 | 138 | N/D | V0 |
| S36 | 1.5 | 58 | 0.94 | 132 | N/D | V0 |
| CS A | 2.7* | 22 | 237* | N/A | Yes | N/D |
| CS B | 1.66* | 19 (flow)/ 36 (x-flow)* | N/D | 217* | N/D | N/D |
| CS C | 1.51* | 20 (flow)* | 0.29* | 217* | N/D | N/D |
| CS D | 1.24* | 53* | 0.26* | 190 | N/D | N/D |
| CS E | 1.7 | 35 | N/D | 90 | N/D | N/D |

N/D = Not Determined
*Properties not measured; data reported obtained from literature
**Plating procedure followed according to the description provided in U.S. Provisional Pat. application Ser. No. 61/577,918

As seen in Table 7, Samples S27-36 have low densities relative to conventional aluminum (CS A) and have higher thermal conductivities compared to incumbent polymer-based materials (CS B to CS D) while providing acceptable coefficients of thermal expansion. Additionally, Samples S27-36 provide superior glass transition temperature compared to glass-filled polyethylene terephthalate (CS E).

Example 4—Filled Foamed Polymer Composite Comparison

Prepare a Sample (S37) and Comparative Sample (CS F) having the compositions shown in Table 8, below, using the procedures outlined in Example 1, above.

TABLE 8

Sample Compositions S37 and CS F

| Sample No. | Polysulfone (wt %/vol %) | Quartz (wt %/vol %) | Glass Microspheres (wt %/vol %) | Graphite (wt %/vol %) |
|---|---|---|---|---|
| S37 | 53/70 | 37/22.5 | — | 10/7.5 |
| CS F | 73/70 | — | 14/22.5 | 14 7.5 |

As shown in Table 8, CS F comprises hollow glass microspheres as a filler instead of quartz. The glass microspheres are 3M™ Glass Bubbles iM30K having a density of 0.6 g/cm$^3$ and a diameter of 17 μm, available from 3M Company, St. Paul, Minn., USA. Use of the hollow glass microspheres is intended to simulate a foamed polymer for comparison to the non-foamed polymer of S37. Analyze S37 and CS F according to the procedures described in the Test Methods section, above. Results are provided in Table 9, below.

TABLE 9

Sample Properties S37 and CS F

| Sample No. | Density (g/cm$^3$) | Coefficient of Thermal Expansion (μm/m · K) | Thermal Conductivity (W/m · K) | Glass Transition Temperature (° C.) |
|---|---|---|---|---|
| S37 | 1.6 | 45 | 0.83 | 190 |
| CS F | 1.1 | 42 | 0.44 | 190 |

As seen in Table 9, the presence of the hollow glass microspheres, as expected reduces density, but reduces the thermal conductivity of the polymer composite by almost 50% which is not desirable.

Example 5—Dimensional Stability Evaluation

Figure 1:
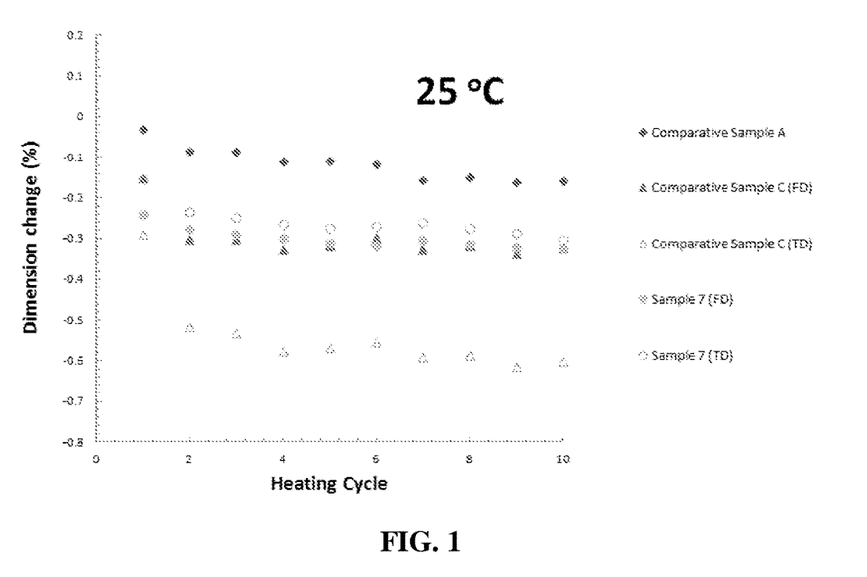
FIG. 1 is a plot of heating cycle versus dimension change percentage measured at 25° C. for samples CS A, CS C, and S7, as prepared in Example 5.
Figure 2:
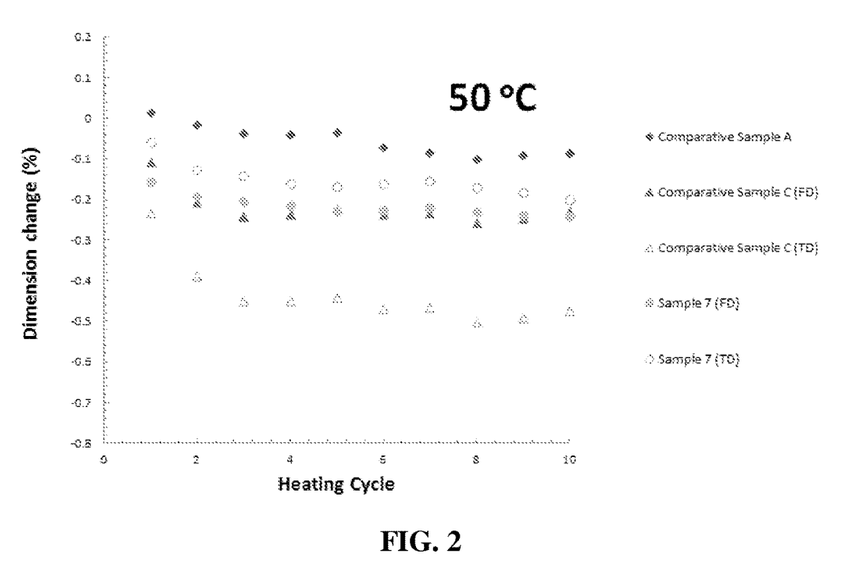
FIG. 2 is a plot of heating cycle versus dimension change percentage measured at 50° C. for samples CS A, CS C, and S7, as prepared in Example 5.
Figure 3:
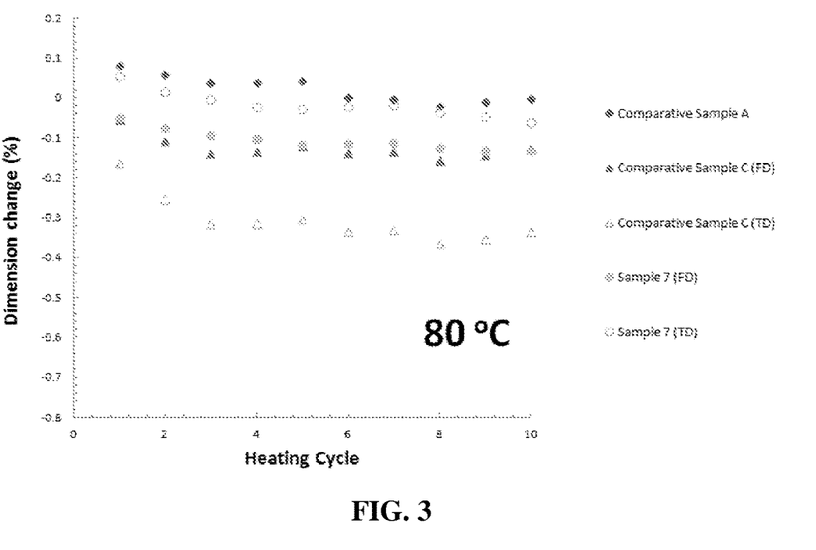
FIG. 3 is a plot of heating cycle versus dimension change percentage measured at 80° C. for samples CS A, CS C, and S7, as prepared in Example 5.

Prepare specimens having an approximate thickness of 0.318 cm from the above-described samples CS A, CS C, and Sample 7 (S7) for thermomechanical evaluation. The specimen for CS A is prepared by machining from a cover plate of an aluminum RF cavity filter of approximate dimensions 38-cm length, 23-cm width, and 4.4-cm depth. Copper or silver plating is removed from the aluminum specimen before evaluation. The specimen for CS C is prepared by machining from an extruded rod of material with 2.54-cm diameter (purchased from Interstate Plastics) in such a way as to prepare samples measuring the dimensional stability in both the flow (FD) and transverse (TD) directions. The specimen for Sample 7 (S7) is prepared by injection molding a specimen of length 17.8 cm, width 1.3-1.9 cm, and thickness of 0.318-0.953 cm. The resin is first dried at 150° C. overnight and the 190-ton molding machining set to barrel temperatures of 338° C. (nozzle), 338° C. (zone 1), 332° C. (zone 2), 332° C. (zone 3), and 327° C. (zone 4). The mold temperature is set to 82° C., hold pressure is 1500 psi, and cooling time 28 seconds. Thermomechanical specimens are prepared from the injection-molded bar in such a way as to prepare samples measuring the dimensional stability in both the flow (FD) and transverse (TD) directions. Thermomechanical analysis of the samples is performed using a TA Instruments Q400 thermomechanical analyzer by cycling the temperature from −50° C. to 100° C. to −50° C. at a heating/cooling rate of 1° C./min and measuring (during the cycle) the dimensional change in one direction compared to the original dimension at ambient. Multiple dimensions are measured by preparing specimens oriented in different directions. The data points at 25° C., 50° C., and 80° C., which are common operating temperatures for applications contemplated herein, upon the heating portion of the cycle are collected and plotted as a function of cycle to demonstrate the difference in dimensional stability between the materials. FIG. 1 presents the data collected at 25° C., FIG. 2 presents the data collected at 50° C., and FIG. 3 presents the data collected at 80° C. As can be seen in FIGS. 1-3, S7 shows excellent dimensional stability upon each successive temperature cycle in both the flow direction ("FD") and transverse direction ("TD"). Additionally, there is little variation between the level of dimension change at the flow direction versus the transverse direction for S7, whereas CS C shows significant variation between the flow direction and the transverse direction.

The invention claimed is:

1. An apparatus, comprising:
   a wireless-communications-tower component being at least partially formed from a polymer composite,
   wherein said polymer composite comprises a thermoplastic polymer and a filler,
   wherein said thermoplastic polymer is selected from polysulfone, polycarbonate, or combinations thereof,
   wherein said thermoplastic polymer is present in said polymer composite in an amount ranging from 40 to 60 weight percent, based on the total weight of the polymer composite,
   wherein said filler comprises a first low-CTE filler having a CTE of less than 15 μm/m·K and a second thermally conductive filler having a thermal conductivity of at least 20 W/m·K, wherein the first low-CTE filler and the second thermally conductive filler are different,
   wherein said filler is present in said polymer composite in an amount ranging from 40 to 60 weight percent, based on the total weight of the polymer composite,
   wherein said thermoplastic polymer is non-foamed,
   wherein said polymer composite is thermoplastic,
   wherein said polymer composite has a thermal conductivity of at least 0.5 watt per meter Kelvin ("W/m·K") measured at 25° C.,
   wherein said polymer composite has a density of less than 2.1 grams per cubic centimeter ("g/cm$^3$") measured at 25° C.,
   wherein said polymer composite has a linear, isotropic coefficient of thermal expansion ("CTE") of less than 60 micrometers per meter Kelvin ("μm/m·K") over a temperature range of −50 to 100° C.,
   wherein said polymer composite has a glass transition temperature ("Tg") of at least 90° C., wherein said wireless-communications-tower component is an RF cavity filter, wherein at least a portion of said polymer composite is copper and/or silver plated.

2. The apparatus of claim 1, wherein the CTE of said polymer composite varies by less than 60% over the temperature range of from −50 to 100° C. between any two of the three planar dimensions of said polymer composite.

3. The apparatus of claim 1, wherein said filler has a density of 2.7 g/cm$^3$ or less, wherein said filler comprises at least one component selected from the group consisting of quartz, fused silica, aluminum flakes, magnesium powder, graphite, expanded graphite, and mixtures of two or more thereof.

4. The apparatus of claim 1, wherein the first low-CTE filler has a CTE of less than 10 μm/m·K and the second thermally conductive filler has a thermal conductivity of at least 50 W/m·K.

* * * * *